Dec. 31, 1929.  A. R. ORGILL  1,741,429
TRAP
Filed Nov. 9, 1928  2 Sheets-Sheet 1
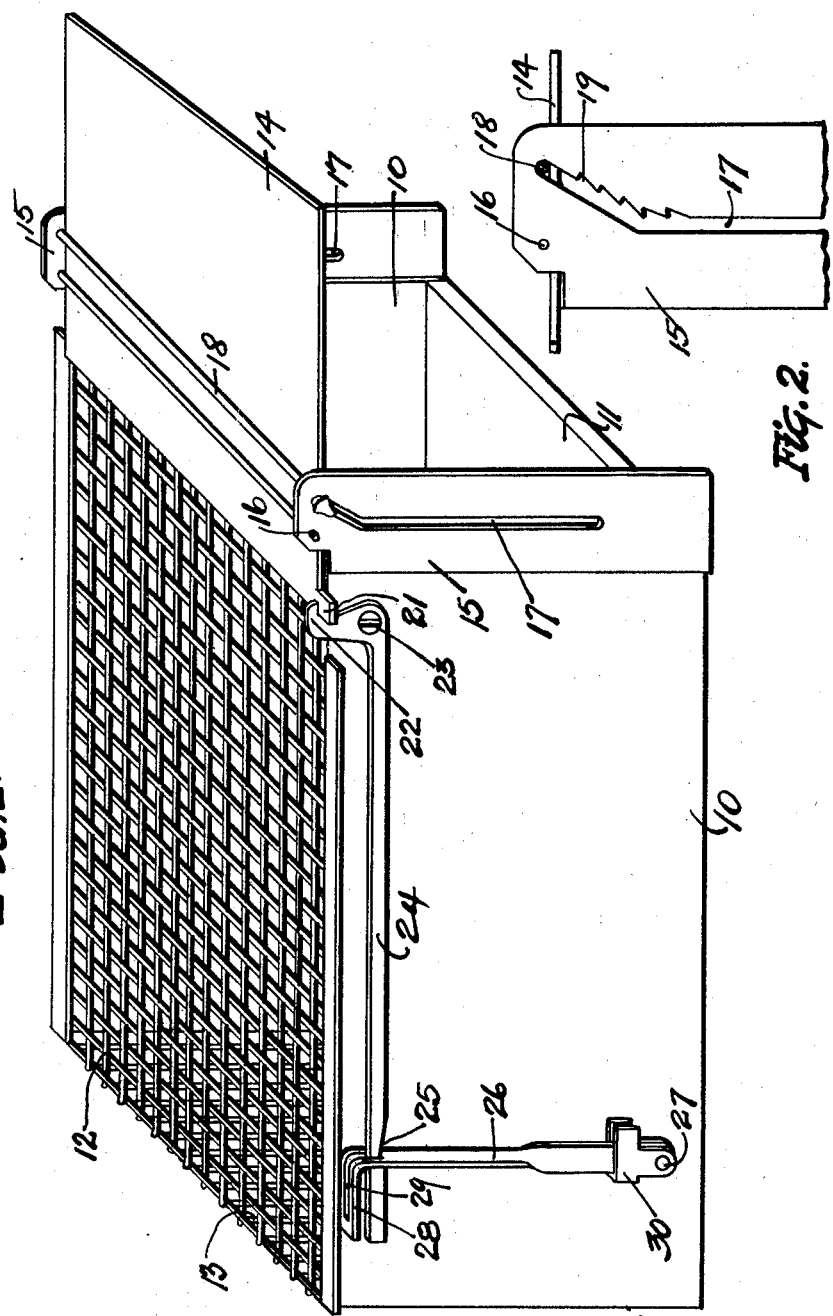
INVENTOR
ARTHUR REGINALD ORGILL
by J.H. Weatherford
ATTORNEY.

Dec. 31, 1929.　　　A. R. ORGILL　　　1,741,429
TRAP
Filed Nov. 9, 1928　　　2 Sheets-Sheet 2
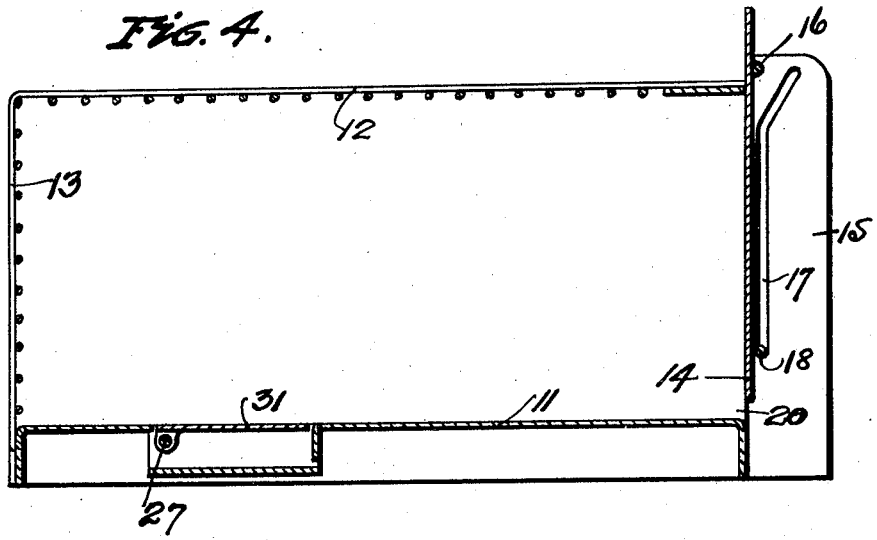
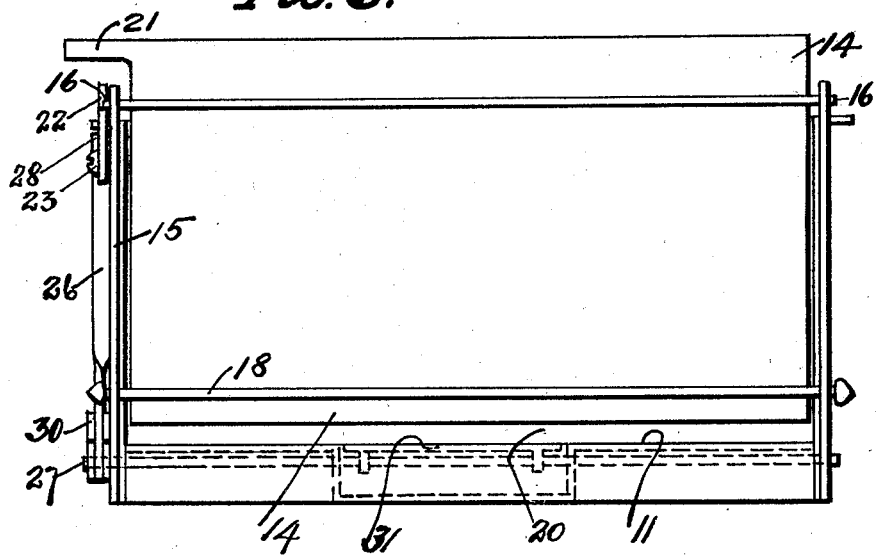
INVENTOR
ARTHUR REGINALD ORGILL
by J. H. Weatherford
ATTORNEY.

Patented Dec. 31, 1929

1,741,429

UNITED STATES PATENT OFFICE

ARTHUR REGINALD ORGILL, OF MEMPHIS, TENNESSEE

TRAP

Application filed November 9, 1928. Serial No. 318,113.

This invention relates to traps and especially to traps for rats and animals of larger size, depending upon the size of trap, the construction and arrangement being such that the animals will be caught and kept alive and also such that, so far as possible, serious injury to the animal will be avoided.

The objects of this invention are:

(a) To provide means for springing the trap which only can be operated when the animal is well within the trap;

(b) To provide means for securing the trap door whereby it will be latched against opening from within, at substantially all times after its starts to shut;

(c) To provide a door which does not close tightly against the bottom of the trap whereby a space is left between the bottom of the door and the trap when the door is closed which will minimize injury to the animal caught in the trap;

(d) To generally improve the design and construction of such a trap and especially to eliminate spring action from the construction thereof; and (e) To provide a device of this character which is simple and inexpensive to manufacture, easy to set up, positive in action, efficient and durable in service and a general improvement in the art.

The means by which the foregoing and other objects are accomplished and the manner of their accomplishment will be readily understood from the following specification on reference to the accompanying drawings, in which:

Fig. 1, is a perspective view of the exterior of the trap with the door open and trap set.

Fig. 2, is a slightly enlarged fragmentary detail of the door latching device.

Fig. 3, is an end elevation of a trap with the door shut and latched and Fig. 4, is a longitudinal sectional elevation also with the door shut and latched.

Referring now to the drawings, in which the various parts are indicated by numerals, 10 are the sides of the trap, 11 the bottom, 12 a top shown of meshed wire and 13 a back end of similar material. 14 is the trap which is pivotally mounted in side members 15, on pins 16, which project through the members 15. Preferably these pins are the ends of a single continuous wire which extends across the door from side to side thereof and is secured to the doors as by soldering. The pivot pins 16 are disposed slightly above the top of the trap so that when the door is fully open, as shown in Fig. 1, the upper part rests substantially flat on top of the trap.

The side members 15 are each provided with a slot 17 in which is loosely disposed a cross rod 18. If desired notches 19 may be formed along the forward edges of these slots. It will be noted, by reference to Figs. 3 and 4, that the door 14 clears the bottom 11 so that an open space 20 is left between the bottom of the door and the trap floor which will prevent a leg or the tail of an animal caught in the trap from being tightly jammed against the floor.

21 is a lateral projection from the door which projection is engaged by a latch 22 when the door is fully opened and when so engaged holds the door open. The latch 22 is pivoted at 23 to one of the sides 10 and has a rearwardly extending arm 24 which is provided near its rear end with a notch 25. The latch arm 24 is supported by a trip arm 26, which trip arm is pivoted on a cross shaft 27, extending transversely across beneath the floor of the trap and journalled in the sides thereof. The upper end 28 of the trip arm is bent backward at right angles and is provided with a slot 29 in which the arm 24 is disposed.

Secured to the cross shaft 27 is a yoke 30 which embraces the trip arm 26 and which moves the trip arm forwardly. Also secured to the cross shaft 27, is a trip plate 31, which plate when depressed by the weight of an animal such as a rat, turns the rod 27 thus similarly turning the yoke 30 and swinging the trip arm 26 forward to allow the latch arm 24 to drop and disengage the latch 22 from the door projection 21. It will be noted that the trip arm not being attached to the yoke 30 can swing forward out of the yoke during this movement, thus allowing the latch arm to drop far enough to release the latch.

In using the trap the rod 18 is raised in the slots 17 and the top end of the door 14 pushed back and engaged under the latch 22. The trip arm 26 is then pushed up to support the latch arm and in so doing the yoke 30 is pushed back and the trip plate 31 thereby raised to floor level. Such bait as it is desired to be used is then scattered within the trap and the trap is ready for its victim. It will be noted that when thus set, the door 14 supports the rod 18. When an animal enters the trap and walks toward the rear end thereof, it will eventually step on the trip plate, depressing the same, thus causing the yoke 30 to swing the arm 26 from under the arm 24 and disengaging the latch 22, allowing the door to swing downward and inward to close the end of the trap. During the downward swing of the door, the rod 18 will fall along the slots 17 and will ordinarily prevent the door, at any time after it has partially closed, from re-opening. I have found however, that immediately after the door has started to close it is possible to re-open the same by pressure from within and in order to avoid such contingency I deem it expedient at times to provide the notches 19 in the plates forming the forward edges of the slots, but even in this case it is only necessary to notch a small portion of the upper end of the slots. It will be seen therefore that any animal within the trap frightened by the movement of the trip plate and trying to escape would run into a door closing against him, which door he could not push open even though it had not fully closed and which door on any relaxation of pressure would further close and eventually shut tight.

It will be noted that the plates 15 are shown as separate pieces secured to the forward edges of the sides 10. It will however be readily seen and distinctly understood that these pieces may be integral portions of the forward ends of the sides 10 and will be hereinafter so considered. It will be noted also that the action of all the movements of this trap is accomplished without the aid of springs.

Having described my invention, what I claim is:

1. An animal trap having a bottom, and sides projecting forwardly beyond said bottom, each of said sides being provided with a vertically disposed slot near its forward end, a door hinged in the upper portion of said sides rearward of and adjacent said slots, a transverse rod disposed in said slots, adapted when said door is open to rest thereon, and to drop along said slots and prevent opening of said door as same closes, a latch, pivotally mounted on one of said sides, engageable with said door to hold same open, an arm integral with said latch and extending rearwardly therefrom, a trip arm supporting said latch arm, a transverse rod pivotally mounted in said sides below said floor, a trip plate secured to said rod and normally flush with said floor, and a yoke secured to said rod and engaging said trip arm, whereby when said trip plate is depressed said yoke will displace said trip arm and allow said latch arm to swing downward, disengaging said latch from said door.

2. An animal trap having a bottom, and sides, each provided with a vertically disposed slot near its forward end, a door hinged in the upper portion of said sides rearward of and adjacent said slots, a transverse rod disposed in said slots, adapted when said door is open to rest thereon, and to drop in said slots and prevent opening of said door after closing begins, a latch engageable with said door to hold same open, and means for disengaging said latch.

3. An animal trap having a bottom, and sides, each provided with a vertically disposed notched slot near its forward end, a door hinged in the upper portion of said sides rearward of and adjacent said slots, a transverse rod disposed in said slots, adapted when said door is open to rest thereon, and to drop in said slots and prevent opening of said door after closing begins, a latch, engageable with said door to hold same open, and means for tripping said latch.

4. An animal trap having a top, a rear end, a bottom, and sides each provided with a vertically disposed slot near its forward end, a door hinged in the upper portion of said sides rearward of and adjacent said slots, adapted when closed to have its lower edge clear of said bottom, a transverse rod disposed in said slots, adapted when said door is open to rest thereon, and to drop along said slots and prevent opening of said door after closing begins, a latch, pivotally mounted on one of said sides, engageable with said door to hold same open, an arm integral with said latch and extending rearwardly therefrom, a trip arm supporting said latch arm, a transverse rod pivotally mounted in said sides below said floor, a trip plate secured to said rod and normally flush with said floor, a yoke secured to said rod and engaging said trip arm, whereby when said trip plate is depressed said yoke will displace said trip arm and allow said latch arm to swing downward, disengaging said latch from said door.

In testimony whereof I hereunto affix my signature.

ARTHUR REGINALD ORGILL.